US012708245B2

(12) United States Patent
Grotlisch

(10) Patent No.: US 12,708,245 B2
(45) Date of Patent: Aug. 18, 2026

(54) CLEANING DEVICE FOR COOKING SURFACE AND METHOD

(71) Applicant: George P. Grotlisch, Naples, FL (US)

(72) Inventor: George P. Grotlisch, Naples, FL (US)

( * ) Notice: Subject to any disclaimer, the term of this patent is extended or adjusted under 35 U.S.C. 154(b) by 0 days.

(21) Appl. No.: 19/210,567

(22) Filed: May 16, 2025

(65) Prior Publication Data

US 2025/0352021 A1 Nov. 20, 2025

Related U.S. Application Data

(60) Provisional application No. 63/648,425, filed on May 16, 2024.

(51) Int. Cl.
*A47L 13/16* (2006.01)
*B08B 1/30* (2024.01)

(52) U.S. Cl.
CPC ................ *A47L 13/16* (2013.01); *B08B 1/30* (2024.01)

(58) Field of Classification Search
CPC .......... A47L 13/16; A47L 13/07; A47L 13/10; B08B 1/30
See application file for complete search history.

(56) References Cited

U.S. PATENT DOCUMENTS

| | | | |
|---|---|---|---|
| 1,503,359 A | 7/1924 | Fabricius-Bjerre | |
| 1,702,530 A | 2/1929 | Williams | |
| 4,188,447 A | 2/1980 | Ehlenz | |
| 4,351,081 A | 9/1982 | Tarkinson | |
| 4,569,861 A | 2/1986 | Smith et al. | |
| 4,813,944 A | 3/1989 | Haney et al. | |
| 4,935,276 A | 6/1990 | Pawlowski et al. | |
| 6,916,382 B1 | 7/2005 | Aldredge | |
| 7,650,664 B2 | 1/2010 | Henderson et al. | |
| 9,144,363 B2 | 9/2015 | Moskowitz et al. | |
| 11,033,139 B2 | 6/2021 | Rozner et al. | |
| 2001/0023159 A1 | 9/2001 | Chen et al. | |
| 2003/0041469 A1* | 3/2003 | Turtzo | A21C 15/00 34/89.1 |
| 2005/0177964 A1 | 8/2005 | Cisneros | |

FOREIGN PATENT DOCUMENTS

| | | | |
|---|---|---|---|
| CN | 102741046 A * | 10/2012 | B32B 5/26 |

OTHER PUBLICATIONS

U.S. Pat. No. 769,541; Greeder, H., Cleaning and Waxing Pad, (Sep. 6, 1904) (3 pages).

* cited by examiner

*Primary Examiner* — Shay Karls
(74) *Attorney, Agent, or Firm* — Hartman Global IP Law; Gary M. Hartman; Domenica N.S. Hartman

(57) ABSTRACT

Cleaning devices for cooking surfaces and methods for their use. Such a cleaning device has an absorbent pad configured to absorb residual liquid food products such as a liquid cooking grease and/or oil, a heat shield attached to one side of the absorbent pad, and a foldable handle attached to an opposite side of the heat shield. The foldable handle includes a base portion secured to the heat shield and a gripping portion that is not secured to the heat shield so that the gripping portion can be folded away from the heat shield. The absorbent pad, handle, and heat shield are constructed from one or more heat and flame resistant materials.

19 Claims, 2 Drawing Sheets

CLEANING DEVICE FOR COOKING SURFACE AND METHOD

CROSS-REFERENCE TO RELATED APPLICATIONS

This application claims the benefit of provisional U.S. Patent Application No. 63/648,425 filed May 16, 2024, the contents of which are incorporated herein by reference.

BACKGROUND OF THE INVENTION

The invention relates generally to cleaning devices suitable for cleaning cooking surfaces and methods of cleaning cooking surfaces with the cleaning devices.

Cookware, such as frying pans, broiler pans, skillets, pots, microwave ovens, and the like, can often accumulate cooking waste, such as grease, oil, fats, and/or food scraps, on their cooking surfaces during use for cooking various foods. Cleaning the cooking surfaces of cookware typically requires the removal of the fats, grease, oil, food scraps, etc. However, liquid portions of cooking wastes, particularly fats, greases, and/or cooking oils, can damage drains, septic systems, and sewer systems. For example, improper disposal of fats, oils, and grease in a kitchen drain can result in plumbing clogs and even total blockages in drain pipes.

To overcome this, it is common to remove as much of the excess grease, oil, fats, and/or food scraps from cookware surfaces prior to washing in a sink or dishwasher, and then dispose of this cooking waste in a waste container separate from any wastewater drainage system. However, it is often undesirable to simply pour the liquid portions of the cooking waste into a waste container can because of the liquid mess that could accumulate in the bottom of the container. To overcome this problem, paper towels are often used to soak up the liquid waste portion on cookware surfaces, after which the soaked paper towel can be thrown in a waste container. However, doing so comes with the risk of burns from contact with the hot liquid waste portions and/or the hot cookware because the paper towel provides no significant protection from touching the hot liquids or hot cooking surface of cookware.

Therefore it would be desirable to have a device for cleaning a cooking surface that can both absorb liquid portions of cooking waste on cookware surfaces and protect an individual from or reduce the danger of burns from hot cooking waste and/or hot surfaces of the cookware.

BRIEF SUMMARY OF THE INVENTION

The intent of this section of the specification is to briefly indicate the nature and substance of the invention, as opposed to an exhaustive statement of all subject matter and aspects of the invention. Therefore, while this section identifies subject matter recited in the claims, additional subject matter and aspects relating to the invention are set forth in other sections of the specification, particularly the detailed description, as well as any drawings.

The present invention provides, but is not limited to, cleaning devices and methods of cleaning cooking surfaces with the cleaning devices.

According to a nonlimiting aspect, a cleaning device includes an absorbent pad configured to absorb a residual liquid food product, a heat shield having a first surface attached to the absorbent pad and a second surface opposite the first surface, and a foldable handle including a gripping portion and a base portion. The base portion is secured to the second surface of the heat shield, and the gripping portion is not secured to the base heat shield to be able to fold away from the heat shield. The absorbent pad, handle, and heat shield are constructed from a heat and flame resistant material.

According to another nonlimiting aspect, a method of cleaning a cooking surface with the cleaning device is provided. The method includes placing the absorbent pad of the cleaning device in a residual liquid food product resulting from cooking, absorbing, with the absorbent pad, a liquid portion of the residual liquid food product from the cooking surface, and wiping the residual liquid food product from the cooking surface with the absorbent pad while grasping the gripping portion of the foldable handle.

Technical aspects of cleaning devices and methods as described above preferably include the ability to reduce plumbing issues that can occur as a result of pouring residual liquid food products, as nonlimiting examples, cooking greases and oils, into a drain, as well as the ability to reduce danger of getting burned by hot waste and/or surfaces during the cleaning of cookware.

These and other aspects, arrangements, features, and/or technical effects will become apparent upon detailed inspection of the figures and the following description.

DETAILED DESCRIPTION OF THE INVENTION

Figure 1:
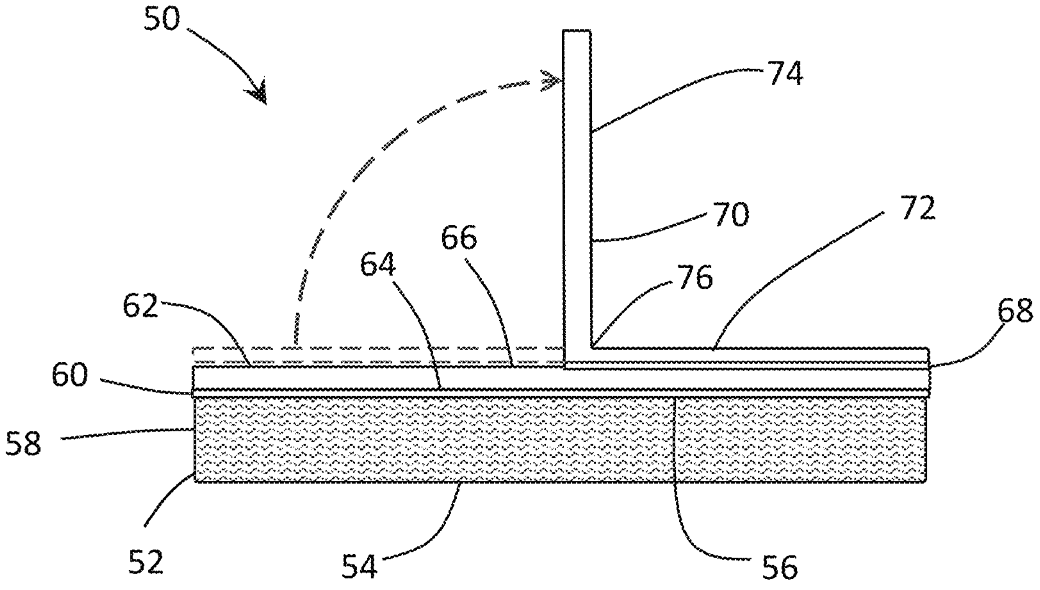
FIG. 1 is a front side view of a cleaning device for cooking surfaces according to a nonlimiting embodiment of the invention, wherein the cleaning device is shown with a foldable handle that can be pivoted between a folded-down storage position and a folded-up use position.

The intended purpose of the following detailed description of the invention and the phraseology and terminology employed therein is to describe one or more nonlimiting embodiments of the invention, and to describe certain but not all aspects of what is depicted in the drawings, including the embodiment(s) to which the drawings relate. The following detailed description also identifies certain but not all alternatives of the embodiment(s). As nonlimiting examples, the invention encompasses additional or alternative embodiments in which one or more features or aspects shown and/or described as part of a particular embodiment could be eliminated, and also encompasses additional or alternative embodiments that combine two or more features or aspects shown and/or described as part of different embodiments. Therefore, the appended claims, and not the detailed description, are intended to particularly point out subject matter regarded to be aspects of the invention, including certain but not necessarily all of the aspects and alternatives described in the detailed description.

Although the invention will be described hereinafter in reference to the disc-shaped cleaning device for cleaning food and cooking waste from cooking surfaces/cookware shown in the drawings, it will be appreciated that the teachings of the invention are also generally applicable to other shapes and sizes and types of applications, such as, but not limited to, rectangular, polygonal, oval, or other more free-form shapes, and could be used for cleaning surfaces other than cooking surfaces of liquids and/or solids of different types.

To facilitate the description provided below of the embodiment(s) represented in the drawings, relative terms, including but not limited to, "proximal," "distal," "anterior," "posterior," "vertical," "horizontal," "lateral," "front," "rear," "side," "forward," "rearward," "top," "bottom," "upper," "lower," "above," "below," "right," "left," etc., may be used in reference to the orientation of the cleaning device during its use and/or as represented in the drawings. All such relative terms are useful to describe the illustrated embodiment(s) but should not be otherwise interpreted as limiting the scope of the invention.

As used herein the terms "a" and "an" to introduce a feature are used as open-ended, inclusive terms to refer to at least one, or one or more of the features, and are not limited to only one such feature unless otherwise expressly indicated. Similarly, use of the term "the" in reference to a feature previously introduced using the term "a" or "an" does not thereafter limit the feature to only a single instance of such feature unless otherwise expressly indicated.

The present application discloses a cleaning device 50 for cleaning cooking waste from cooking surfaces and methods of using such a device 50. The cleaning device 50 includes an absorbent pad 52 that can absorb residual liquid food products, including cooking greases and oils, from cooking surfaces of cookware, including but not limited to frying pans, broiler pans, skillets, and microwave ovens. In some embodiments, the cleaning device 50 can also be used to physically clean, wipe, and/or scour cooking debris from a cooking surface in addition to absorbing waste liquids.

Figure 2:
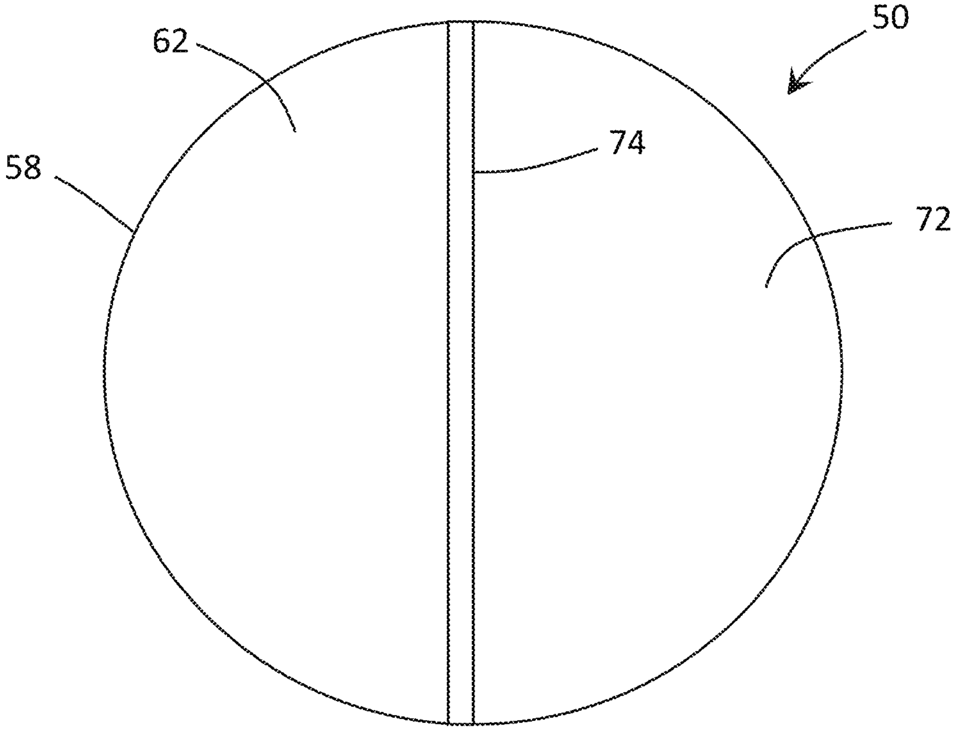
FIG. 2 is a top view of the cleaning device of FIG. 1.
Figure 3:
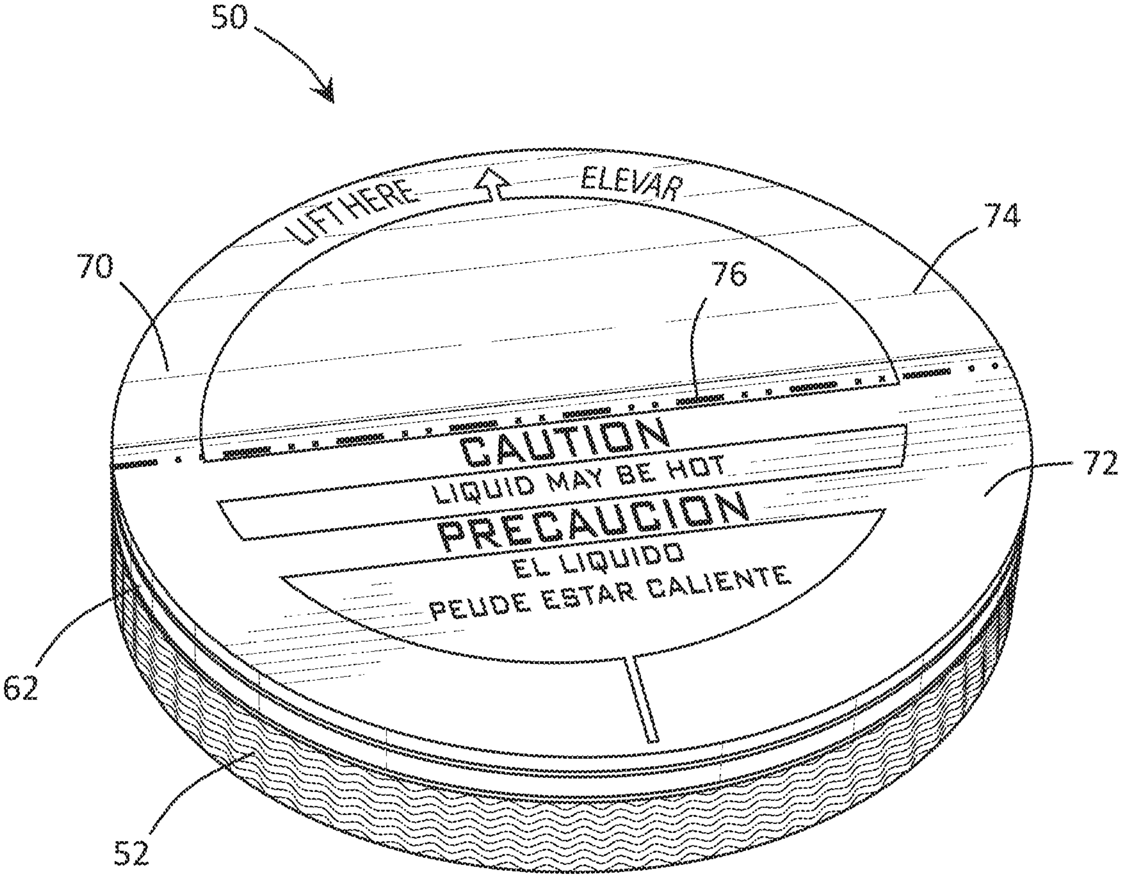
FIG. 3 is a perspective view of the cleaning device of FIG. 1, and represents the handle in the storage position.

FIGS. 1 through 3 represent nonlimiting examples of the cleaning device 50 and its absorbent pad 52, and depicts the device 50 as further including a heat shield 62 and a foldable handle 70. The absorbent pad 52 is disposed on a lower surface 64 of the heat shield 62, and the handle 70 is disposed on an oppositely-disposed upper surface 66 of the heat shield 62. As illustrated with dashed lines in FIG. 1, the handle 70 is adapted to have a folded-down storage position in which the handle 70 lies generally flat against the upper surface 66 of the heat shield 62. From the storage position, the handle 70 can be pivoted away from the upper surface 66 to a folded-up use position in which the handle 70 is angled upwardly away from the upper surface 66 of the heat shield 62. In the use configuration, a user can readily grasp the handle 74 in order to handle and manipulate the device 50, such as for the purpose of absorbing liquids, including hot liquid cooking wastes on cooking surfaces of cookware, with the absorbent pad 52 located on the lower surface 64 of the heat shield 62. The handle 70 and heat shield 62 protect the user's fingers from touching any hot liquids and/or hot cooking surfaces of the cookware. In addition, the heat shield 62 further protects and/or mitigates the effects on the user's fingers from burns that might be caused by hot cooking wastes and/or a hot cooking surface during the cleaning action. The absorbent pad 52 may also, in some embodiments, be configured to abrasively scrub a cooking surface if desired. After completion of the intended task, the user can dispose of the entire cleaning device 50, such as placement in a waste container.

The absorbent pad 52 is shown in the drawings as shaped as an extruded cylinder of a material capable of absorbing a liquid food product, particularly cooking greases and cooking oils. In this example, the absorbent pad 52 has a circular disc shape with a thickness between about 2% and about 40% of the diameter, preferably about 10% to about 20% of the diameter, though it is foreseeable that other shapes and sizes could be used. The absorbent pad 52 includes a first (lower) surface 54 that defines the lowermost surface of the device 50, and an oppositely-disposed second (upper) surface 56 adjacent and optionally directly bonded to the lower surface 64 of the heat shield 62. The absorbent pad 52 further has an outer peripheral sidewall 58 that extends between the first and second surfaces 54 and 56 in a thickness direction of the pad 52. The lower surface 54 of the absorbent pad 52 is configured to contact a cooking surface to be cleaned, for example, the flat lower surface 54 shown in FIG. 1. In addition, the lower surface 54 of the absorbent pad 52 may be a textured surface that provides a roughness suitable for scrubbing adhesive cooking debris on a cooking surface of cookware.

The material of the absorbent pad 52 preferably possesses desirable physical characteristics of absorbency, wet strength, compressibility, flame resistance, and an ability to withstand a high temperature environment (greater than 450° F. (about 230° C.). The rate of absorption is typically dependent on the nature of the material and capillary action created by interstices within the material, for example, that can be the result of a disentangled, impregnated, aligned, and/or inter-sewing/inter-stitching process used to produce the material of the absorbent pad 52. The absorbent pad 52 may be formed of impregnated paper, a combination of textile fibers, and/or artificial materials capable of sufficiently absorbing liquid food products such as cooking greases, cooking oils, and the like. The absorbent pad 52 may additionally comprise separate fibers that can be mechanically interlocked via a disentangled, impregnated, aligned, and inter-sewn/inter-stitched process. The absorbent pad 52 may consist of or include a nonwoven fabric that comprises natural textile fibers or artificial fibers either alone or in an admixture or wood, wool, cotton, paper, rayon, nylon, polyester, recycled newspaper/garbage, or the like. The nonwoven fabric may be made, for example, of blown fibers or other forming techniques, which form a large number of interstitial pores between individual fibers that can absorb liquids, such as cooking greases and cooking oils. Preferred embodiments of the material for the absorbent pad 52 are believed to comprise a blend of rayon fibers and optionally also polyester fibers to provide strength and durability. Such a fiber blend has been shown to exhibit an excellent liquid grease and oil absorbing capacity. A particular example of such a fiber blend contains 0% to about 50% polyester by weight and the balance rayon, though other suitable blend percentages may be selected depending upon the size and use of the absorbent pad 52. Blends of rayon and polyester fibers have been shown to increase the resistance to the abrasion and deformation of the pad 52 that might otherwise be exhibited by the natural textile fibers or artificial fibers alone, while at the same time providing a flexible, soft, resilient, absorbent, and strong absorbent pad 52. In some embodiments, the absorbent pad 52 may have a thickness of about 0.125 to about 3 inches (about 3 to 76 mm) and have an area density in the range of about 2 to 70 ounces per square yard (about 68 to 2400 grams per square meter). The absorbent pad 52 may be inter-sewn/inter-stitched in an equidistance range of about 0.002 to 3 inches (about 0.05 to 76 mm). The absorbent pad 52 is preferably flame resistant, for example, as a result of being impregnated with a mineral, chemical, or salt such as borax, ammonium sulfate, or any other suitable type impregnated, sprayed, or coated flame resistant agent.

As noted above, the heat shield 62 may be directly attached to the upper surface 56 of the absorbent pad 52. In the embodiment shown in the drawings, the heat shield 62 is shaped to cover the entire upper surface 56 of the absorbent pad 52 and has substantially the same peripheral shape as the absorbent pad 52 such that the heat shield 62 is able to serve as a thermal barrier to the entire upper surface 56 of the absorbent pad 52. Thus, the heat shield 62 may also shaped as an extruded cylinder with the same size and outer peripheral shape as the absorbent pad 52. In this example, the heat shield 62 has a circular disc shape with the same outer diameter as the absorbent pad 52, though other shapes and sizes could be used. The upper surface 56 of the absorbent pad 52 can be attached to the lower surface 64 of the heat shield 62 with a first adhesive layer 60. The first adhesive layer 60 is preferably a high temperature adhesive, such as rubber, reclaimed rubber, plasticizers, silicones, epoxies, thermoplastics (including hot melt glues), elastomers, plastics, varnishes, sodium silicate, pressure sensitive adhesives, or the like.

The handle 70 is attached to the upper surface 66 of the heat shield 62 to provide a structure that can be easily grasped by a user's fingers on the opposite side of the heat shield 62 as the absorbent pad 52 so that the cleaning device 50 can be used while the heat shield 62 remains between the user's fingers and the absorbent pad 52 and any hot liquids (e.g., hot oils, fats, etc.) absorbed therein as well as any hot surface (e.g., a hot cooking surface) being cleaned with the device 50. The handle 70 includes a base portion 72 and a gripping portion 74, with a fold line 76 defined therebetween. The base portion 72 is shown as securely attached to the heat shield 62, for example, with a second adhesive layer 68 therebetween. The gripping portion 74, however, is not directly attached to the heat shield 62, but rather can be free of or only loosely attached to the heat shield 62 so that the gripping portion 74 can be detached from the heat shield 62 and pivoted upward to project away from the heat shield 62 to define a structure that can be easily grasped. The gripping portion 74 is shown as folded upwardly about the fold line 76, which extends across the entire upper surface 66 of the heat shield 62, so that the entire gripping portion 74 extends upward (e.g., perpendicularly) from the base portion 72. In this example, the handle 70 may be a disc and have the same or similar diameter as the heat shield 62 so that, in the storage position, the handle 70 covers the entire upper surface 66 of the heat shield 62. In the drawings, the base portion 72 constitutes one half (the right half as seen in the drawings) of the handle 70, whereas the gripping portion 74 constitutes the remaining half (the left side as seen in the drawings) of the handle 70, though other configurations could be implemented. In any configuration, the gripping portion 74 is configured to allow a user to grip the cleaning device 50 when folded upward in the use position.

The heat shield 62 and the handle 70 may be constructed from materials that are flame resistant and preferably heat insulative to reduce heat transfer to the user's fingers from any hot food products and/or hot cooking surface. For example, the heat shield 62 and the handle 70 may be constructed from semi-rigid fibrous composition material, such as fiberboard, paper, cardboard, chipboard, and/or artificial materials, or the like. The head shield 62 and/or the handle 70 may be made of and/or include other flame-resistant materials, such as heat-resistant polymers (e.g., polyphthalamide, polyetheretherketone, polytetrafluoroethylene, polyetherimide, etc.), ceramics, composite materials, and/or other heat insulative/heat resistant materials. Further, the heat shield 62 and handle 70 may obtain flame resistance through the inclusion of one or more flame retardants, such as one or more flame retardant minerals, chemicals, and/or salts such as borax, ammonium sulfate, or any other suitable type of flame retardant impregnated, sprayed, and/or coated onto the rigid fibrous composition material.

During use of the cleaning device 50, a cookware to be cleaned is removed from a heat source that was used to heat a cooking surface of the cookware. To facilitate manipulation in use, the outer peripheral edge of the gripping portion 74 is folded up away from the heat shield 62 about the fold line 76 to angle the gripping portion 74 away from the heat shield 62, and the cleaning device 50 is grasped by grasping the folded-up gripping portion 74. The absorbent pad 52 may then be placed in the residual liquid food product, such as a liquid cooking grease and/or oil, and liquid portions of the residual liquid food products are quickly absorbed/infiltrated by the absorbent pad 52 from the cooking surface. If desired, the user may optionally grasp the gripping portion 74 of the handle 70 and wipe/scour any matter that may remain adhered to the cooking surface, such as baked-on food by-product residue, thereby also functioning as a scrubbing pad. The user may then dispose of the entire cleaning device 50 in a waste container and then further clean the cookware in a sink or dishwasher, as may be desired.

In some configurations, the cleaning device 50 resolves the difficulties of cleaning a cooking surface that includes residual liquid food products, such as cooking greases and cooking oils, remaining on the surface following the completion of cooking. The cleaning device 50 also may act as a safety device which quickly absorbs potentially hazardous residual liquid food products, which may prevent spillage and/or burns, thus reducing the risk of harm. The cleaning device 50 may be especially useful in helping reduce the risk of burns or spills for individuals in higher risk injury categories, such as children and the elderly.

As previously noted above, though the foregoing detailed description describes certain aspects of one or more particular embodiments of the invention, alternatives could be adopted by one skilled in the art. For example, the cleaning device 50 and its components could differ in appearance and construction from the embodiments described herein and shown in the drawings, functions of certain components of the cleaning device 50 could be performed by components of different construction but capable of a similar (though not necessarily equivalent) function, and various materials could be used in the fabrication of the cleaning device 50 and/or its components. As such, and again as was previously noted, it should be understood that the invention is not necessarily limited to any particular embodiment described herein or illustrated in the drawings.

The invention claimed is:

1. A cleaning device comprising:

an absorbent pad configured to absorb a residual liquid food product and withstand a temperature of greater than 230° C., wherein the absorbent pad comprises rayon fibers;

a heat shield serving as a thermal barrier to an entire upper surface of the absorbent pad, the heat shield having a first surface attached to the upper surface of the absorbent pad and a second surface opposite the first surface, the heat shield comprising a semi-rigid fibrous composition material that is heat insulative, withstands a temperature of greater than 230° C., and is impregnated and/or coated with a flame-retardant material so as to be flame resistant; and a foldable handle including a gripping portion and a base portion, wherein the base portion is secured to the second surface of the heat shield, and the gripping portion is not secured to the heat shield to be able to fold away from the heat shield;

wherein the foldable handle has a storage position in which the gripping portion and the base portion are disposed against the second surface of the heat shield and a use position in which the base portion is disposed against the second surface of the heat shield and the gripping portion is angled away from the heat shield, and wherein in the storage position, the handle covers the entire second surface of the heat shield.

2. The cleaning device of claim 1, wherein the absorbent pad includes a textured surface opposite the heat shield for scouring a cooking surface of a cookware.

3. The cleaning device of claim 1, wherein the absorbent pad consists of the rayon fibers.

4. The cleaning device of claim 1, wherein the absorbent pad comprises a blend of the rayon fibers and polyester fibers to have a polyester fiber content up to about 50% by weight.

5. The cleaning device of claim 1, wherein the absorbent pad comprises a non-woven fabric of the rayon fibers that form interstitial pores between the rayon fibers configured to absorb liquids.

6. The cleaning device of claim 1, wherein the heat shield comprises at least one of borax and ammonium sulfate as the flame-retardant material.

7. The cleaning device of claim 6, wherein the semi-rigid fibrous composition material of the heat shield is paper.

8. The cleaning device of claim 1, wherein the foldable handle is flame resistant and heat insulative and comprises at least one of borax and ammonium sulfate as a flame-retardant.

9. The cleaning device of claim 8, wherein the foldable handle comprises a semi-rigid fibrous composition material impregnated and/or coated with the flame-retardant.

10. The cleaning device of claim 1, wherein the foldable handle has the same outer peripheral shape as the heat shield.

11. The cleaning device of claim 10, wherein the absorbent pad has the same outer peripheral shape as the heat shield.

12. The cleaning device of claim 11, wherein each of the absorbent pad, the heat shield, and the foldable handle has a circular disc shape.

13. The cleaning device of claim 12, wherein each of the absorbent pad, the heat shield, and the foldable handle has the same outer diameter.

14. The cleaning device of claim 1, wherein the cleaning device has a polygonal shape.

15. The cleaning device of claim 1, wherein the cleaning device has an oval shape.

16. A method of cleaning a cooking surface with the cleaning device of claim 1, the method comprising:

placing the absorbent pad of the cleaning device in a residual liquid food product resulting from cooking;

absorbing, with the absorbent pad, a liquid portion of the residual liquid food product from the cooking surface, and wiping the residual liquid food product from the cooking surface with the absorbent pad while grasping the gripping portion of the foldable handle.

17. The method of claim 16, further comprising folding the gripping portion of the foldable handle away from the heat shield for easier grasping before the wiping.

18. The method of claim 16, further comprising disposing the cleaning device after the absorbing and the wiping.

19. The method of claim 16, wherein the residual liquid food product is one or more of cooking greases and cooking oils.

* * * * *